L. P. CRECELIUS.
METHOD OF RAIL BONDING.
APPLICATION FILED AUG. 31, 1916.

1,310,411.

Patented July 22, 1919.
2 SHEETS—SHEET 1.

Inventor
Lawrence P. Crecelius
by Thurston & King
Attys.

UNITED STATES PATENT OFFICE.

LAWRENCE P. CRECELIUS, OF CLEVELAND, OHIO, ASSIGNOR TO THE ELECTRIC IMPROVEMENT COMPANY, OF CLEVELAND, OHIO, A CORPORATION OF OHIO.

METHOD OF RAIL-BONDING.

1,310,411.     Specification of Letters Patent.     Patented July 22, 1919.

Continuation of application No. 95,051, filed May 3, 1916. This application filed August 31, 1916. Serial No. 117,825.

*To all whom it may concern:*

Be it known that I, LAWRENCE P. CRECELIUS, a citizen of the United States, residing at Cleveland, in the county of Cuyahoga and State of Ohio, have invented a certain new and useful Improvement in Methods of Rail-Bonding, of which the following is a full, clear, and exact description.

This invention relates to a method of bonding rails, and the object of the invention is to braze or otherwise attach the bond to the rail and by the same operation, or by the same heating medium which accomplishes that result, to braze or otherwise attach together the terminal portion of the bond conductor and terminal sleeve, which in the process of manufacture of the bond is superficially fastened thereto, by suitable dies. By thus brazing or otherwise attaching the terminal sleeve to the conductor of the bond by the same heating operation which brazes or attaches the bond to the rail, not only is a good and durable electrical and mechanical joint or union obtained between the rail, bond conductor and terminal sleeve, but the manufacture of the bond is facilitated.

My invention may be further briefly summarized as consisting in certain novel steps of the improved method which will be described in the specification and set forth in the appended claims.

The method herein disclosed is described in my prior application for rail bond and process of producing the same, Serial No. 95,051, filed May 3, 1916; and the present application is therefore a continuation of said prior application.

Figure 1:
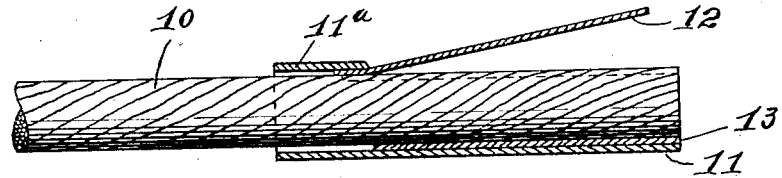
Figure 2:
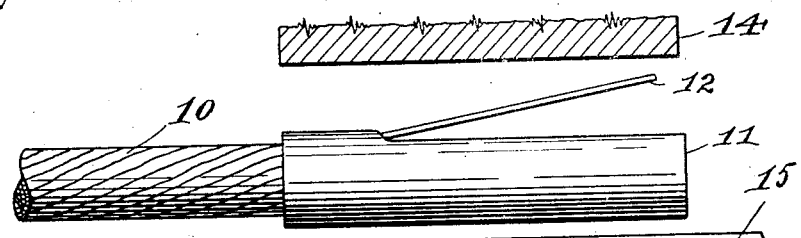
Figure 3:
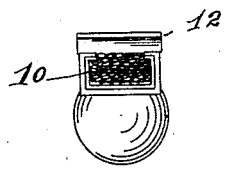
Figure 4:
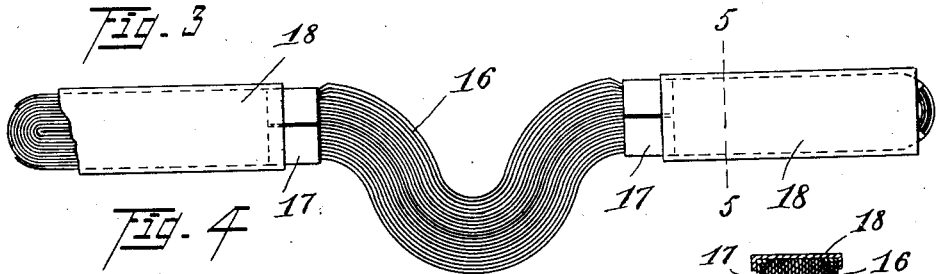
Figure 5:
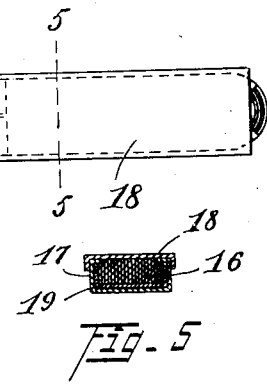
Figure 6:
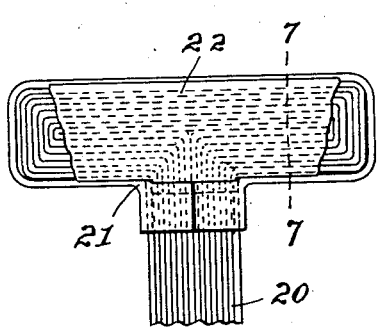
Figures 7, 8:
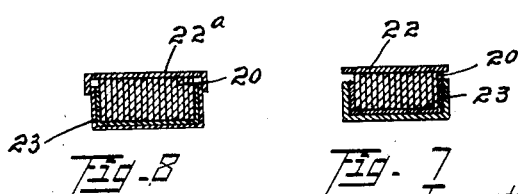
Figure 9:
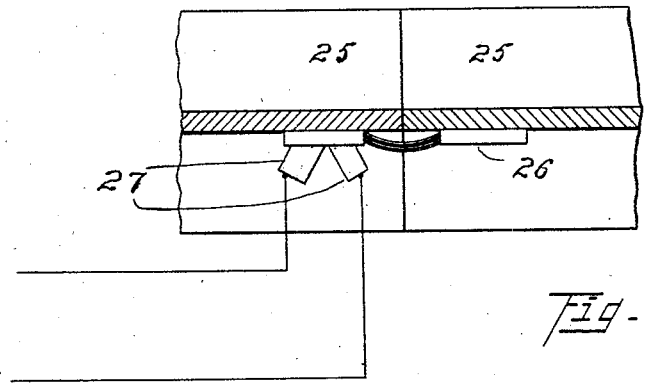
Figure 10:
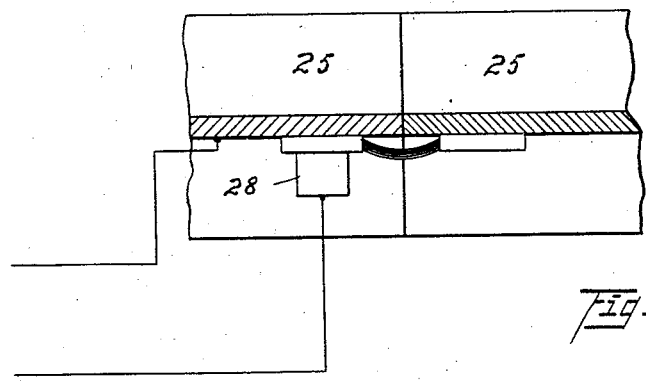
Figure 11:
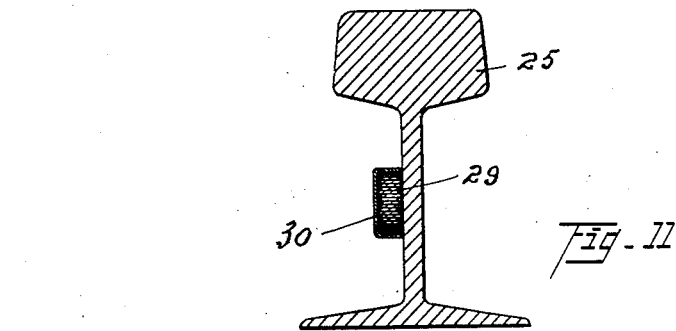

In the accompanying sheets of drawings wherein I have shown several types of bonds which may be advantageously employed in carrying out my method, and have also illustrated the method of bonding, Figure 1 is a view partly in side elevation and partly in section, showing a portion of a bond with the parts assembled just prior to being superficially fastened together by pressure; Fig. 2 is a similar view showing the manner in which the terminal portion of the bond is formed and the parts pressed together between dies; Fig. 3 is an end view of the completed bond ready to be applied to the rail; Fig. 4 is a face view of the modified form of bond, the bond here shown being of the ribbon type; Fig. 5 is a cross sectional view on line 5—5 of Fig. 4; Fig. 6 is a face view of a terminal of a T-type ribbon bond, portions of the sleeve being broken away; Fig. 7 is a transverse sectional view substantially along the line 7—7 of Fig. 6; Fig. 8 is a similar view showing a slight modification; Figs. 9 and 10 are diagrammatic views with the web of the rail in section showing the manner in which the bond is applied either with two, or with a single high resistance heating electrode; and Fig. 11 is a cross sectional view through a rail with the bond attached to the rail.

In putting my invention into practice various types and forms of bonds may be employed, it being essential only that suitable provision be made whereby when the bond is applied to the rail by one or more heating devices, that the terminal sleeve be secured to the conductor which may be formed of wire strands or ribbons, and at the same time the conductor, or conductor and sleeve be secured to the rail. In Figs. 1 and 2 I have shown a bond including a stranded conductor 10 consisting of a bundle of wires. The terminal of the bond includes the end of the conductor 10 and a terminal sleeve 11, which together with the conductor are preferably formed of good conducting material such as copper. It is desirable, in order to obtain the results in the most effective manner, that the sleeve 11 have a portion 11$^a$ which entirely surrounds the terminal portion of the conductor so that the strands in whatever form they may be in will be held together where they leave the terminal, and also in order that they may not be mutilated by the instrumentality or instrumentalities which are utilized in applying the bond to the rail. It is desirable also that this terminal sleeve, beyond the part 11$^a$ which entirely surrounds the conductor, be cut away or open, so that a portion of the conductor will be exposed and may be brazed directly to the rail without the interposition of the terminal sleeve between the conductor and rail.

For the purpose of brazing the bond to the rail there is utilized a piece or strip of brazing material which is preferably incorporated in, or forms a part of the bond. This strip or piece 12 of brazing material is located opposite the exposed portion of the conductor, that is, opposite the portion which is exposed through the terminal sleeve 11. The strip 12 may be attached to the bond terminal in numerous ways, but in this case, one end thereof is slipped under the portion 11ª of the terminal sleeve so that it will be fastened in place by the dies which press the parts together.

In order that the sleeve may be very effectively brazed to the conductor, I preferably incorporate in the bond a second piece of brazing material 13, which is arranged between the conductor and the terminal sleeve, that is, between the conductor and that face or side of the sleeve which is directly opposite the slotted or cut away portion, and which is designed to be engaged by the heating electrode or electrodes, or other heat generating or imparting device which is used in applying the bond to the rail. The inner member 13 may be in the form simply of a flat strip or it may be in the form of a sleeve which partially surrounds the terminal portion of the conductor 10. Furthermore, the brazing pieces 12 and 13 are of such selected materials that the piece or sleeve 13 melts at a somewhat higher temperature than the brazing strip 12, inasmuch as the sleeve 13 will be nearer the source of heat and will be in a hotter region than the strip 12 during the brazing process. As examples of materials which may be used, I might mention silver solder for the brazing strip 12, and brass for the strip or sleeve 13.

After the parts are slipped into place or assembled in the manner illustrated in Fig. 1, the terminal of the bond including the end portion of the conductor and the parts which are assembled on it are placed in a press having dies such as shown at 14 and 15, and the parts are pressed or superficially fastened together. At the same time the terminal of the bond is formed or shaped, it being given the flat shape shown in Fig. 3, thus forming a flat face to be applied to the rail and a flat face to be engaged by the heating device or devices. The cavity in one of the dies, such as in the lower die 15, is so formed that the part which is to be applied to the rail, that is, the part coextensive with the slotted portion of the sleeve 11, is flattened into the desired shape, such as illustrated, and the portion coextensive with the unslotted portion 11ª of the sleeve is left in substantially its rounded form.

In Figs. 4 and 5 I have shown a ribbon type of bond having a conductor 16 formed of one, or a series of ribbons arranged face to face, and provided with a terminal sleeve 17, which at one point or part entirely surrounds the conductor and at other portions only partially surrounds or covers the conductor, leaving an open portion through which the terminal portion of the conductor is exposed, this portion being covered by the brazing strip 18. Between the conductor and the sleeve, opposite the slotted or open portion of the latter, is arranged the strip or piece 19 of brazing material which melts at a slightly higher temperature than the strip 18, as previously described, and is utilized as in the first instance to braze the sleeve to the conductor.

In Figs. 6 and 7 there is shown a T-type ribbon bond composed of a conductor 20, provided with a terminal sleeve 21, a portion of which entirely surrounds the conductor where the strands or ribbons emerge from the sleeve and only partially surround the head of the bond, leaving an exposed face of the terminal portion of the conductor to be brazed to the rail, which face is covered by a brazing strip 22. In Fig. 7, there is shown between the opposite face of the terminal portion of the conductor and the sleeve 21, a strip 23 of brazing material employed for the purpose of brazing the sleeve to the terminal part of the conductor during the bonding operation.

It will be understood that the bonds shown in Figs. 3, 4, 5, 6, 7 and 8 as well as the bond shown in Fig. 1 have the different parts which are incorporated in the terminal portion of the bond superficially fastened together by a pressing operation which is illustrated conventionally in Fig. 2 in connection with the type of bond first described.

Fig. 8 is similar to Fig. 7 except as to the shape and manner of applying the outer brazing strip which brazes the bond to the rail. In Fig. 7 is shown a flat strip which may be fastened in place by having a portion slipped under the sleeve in the manner illustrated in Fig. 6, whereas in Fig. 8 the brazing sleeve designated 22ª is in the form of a cap which is slipped onto the inner face or head of the bond, substantially in the manner illustrated in Fig. 5.

The terminal sleeve may overlap slightly the inner face of the bond conductor as illustrated in Figs. 3 and 5, or the marginal edges of the terminal sleeve may terminate short of the face which is to be brazed to the rail, as illustrated in Figs. 7 and 8. Where the terminal sleeve overlaps slightly the front marginal edges of the conductor, the marginal portions of the sleeve as well as the conductor will be securely brazed to the rail.

The remainder of the process, that is, the brazing process, or the process of attaching the bond to the rail and of attaching the terminal sleeve to the conductor, is illustrated in Figs. 9 to 11. In these figures, 25 designates two adjoining rails and 26 the bond which is applied thereto. To apply the bond to the rail I may use various kinds of heating agencies or devices, but preferably either two series arranged high resistance heating electrodes 27 arranged in a series circuit with a suitable source of current, or as illustrated in Fig. 10, a single high resistance heating electrode 28, either the single electrode or the two electrodes being designed to engage and to be held with suitable pressure against the flat face of the bond opposite the exposed flat face of the conductor. When the bond is heated in the manner explained, it is directly attached to the rail by being brazed thereto, the brazed union being indicated at 29 in Fig. 11, and at the same time the electrode or electrodes which engage the rear or outer face of the bond causes the terminal sleeve to be brazed or attached to the conductor, the brazed surface being indicated at 30 in Fig. 11.

Thus by one operation the parts of the bond are very securely fastened together, and the bond is securely attached to the rail.

While I prefer that the bond be brazed to the rail and that the terminal sleeve at the same time be brazed to the conductor, under certain circumstances, or with suitable apparatus, the bond may be welded to the rail by the application of heat and pressure, in which event, at the same time the sleeve will be welded to the conductor, or it may be brazed to the conductor when the bond is welded to the rail. It will be understood, of course, that by the term brazing or brazing materials, the soft as well as the hard brazing materials are included. In other words, I may employ what is generally covered by the term "soldering materials". I do not, therefore, wish to be confined strictly to brazing, but aim in my claims to cover the securing of the sleeve to the conductor at the same time that the bond is secured to the rail, regardless of the precise means or materials by which these results are attained.

Having thus described my invention, what I claim is:

1. The method of applying a rail bond to a rail which comprises heating the terminal of the bond by applying heat externally to the bond, and during the heating operation attaching the terminal to the rail and attaching together the parts of the terminal.

2. The method of attaching to a rail a bond having a terminal including a conductor and a terminal sleeve which comprises pressing the terminal against the rail, and applying heat to the terminal externally thereof, thereby simultaneously brazing the terminal to the rail and brazing the sleeve to the conductor.

3. The method of applying to a rail the terminal of a bond having a conductor with a terminal member superficially attached thereto, which comprises applying heat externally to the terminal so as to simultaneously firmly secure the conductor to the rail and the terminal member to the conductor.

4. The method of rail bonding which comprises first applying a terminal sleeve to a portion of a bond conductor, and next simultaneously brazing the conductor to the rail and brazing the conductor to the sleeve by pressing a high resistance heating electrode thereto.

5. The method of applying to a rail a rail bond composed of a conductor and a terminal sleeve, which comprises attaching, through the action of heat applied externally to the bond while engaging the rail, the bond to the rail and at the same time attaching the sleeve to the conductor.

6. The method of applying to a rail a rail bond composed of a conductor and a terminal sleeve which comprises simultaneously attaching the sleeve to the conductor and the conductor to the rail by applying heat and pressure to the bond, with the face of the bond distant from the rail heated to a higher degree than the face contiguous to the rail.

7. The method of applying to a rail a rail bond composed of a conductor and a terminal sleeve which comprises pressing the bond against the rail and heating the same so as to simultaneously braze the sleeve to the conductor with a brazing material melting at a given temperature and brazing the conductor to the rail with a brazing material melting at a lower temperature.

8. The method of applying to a rail a rail bond composed of a conductor and a terminal sleeve which comprises pressing against the terminal part of the bond a high resistance heating electrode, and through the medium of electric current heating the electrode and bond with the face of the bond engaged by the electrode heated to a higher degree than the face engaging the rail and thereby brazing the sleeve to the conductor and the conductor to the rail.

9. The method of applying to a rail a rail bond composed of a conductor and a terminal sleeve which comprises heating the bond and through the medium of brazing materials which melt at different temperatures brazing the sleeve to the conductor and the conductor to the rail.

In testimony whereof, I hereunto affix my signature.

LAWRENCE P. CRECELIUS.